United States Patent Office 3,042,392
Patented July 3, 1962

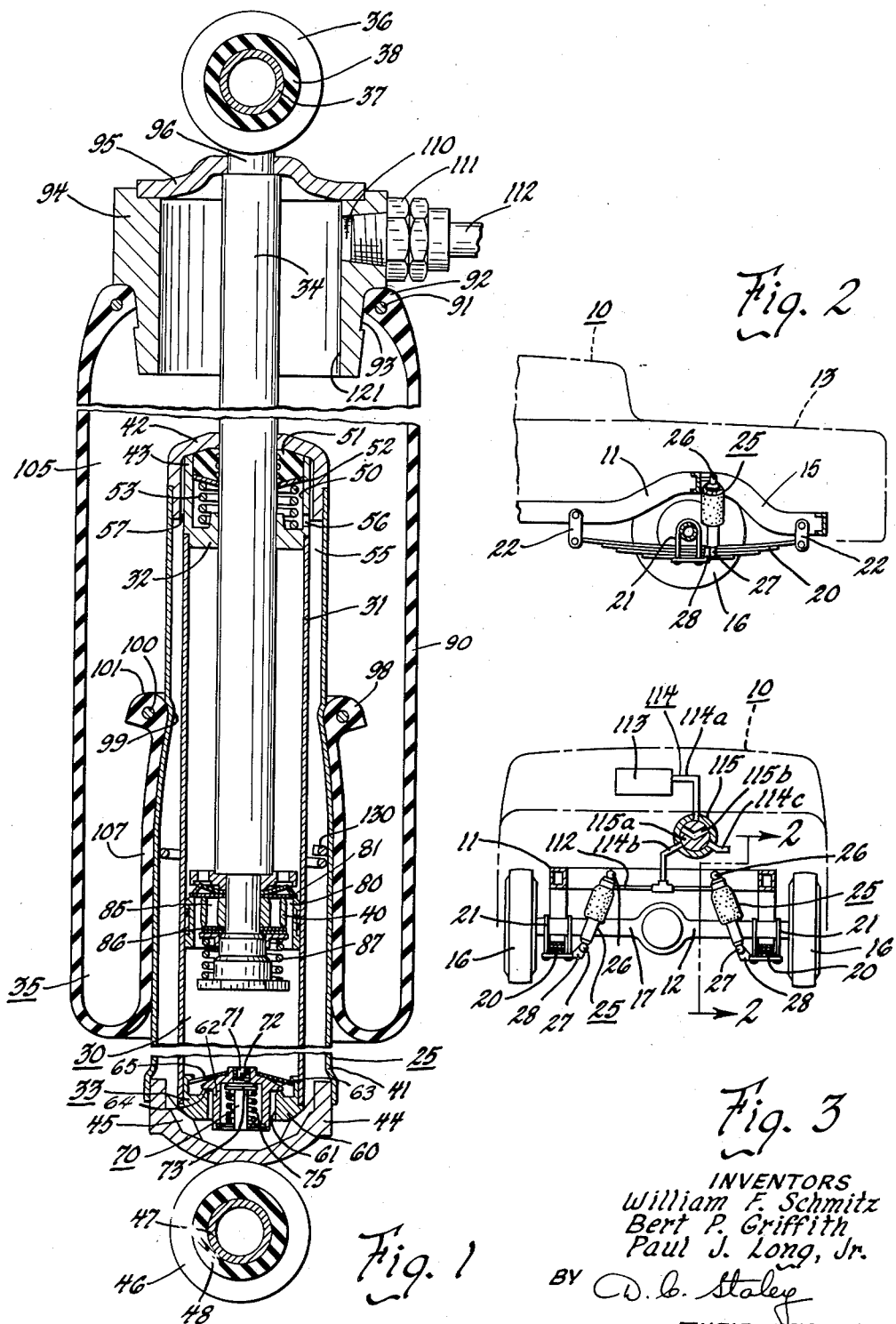

3,042,392
COMBINATION SHOCK ABSORBER
AND AIR SPRING
William F. Schmitz, Bert P. Griffith, and Paul J. Long,
Jr., Dayton, Ohio, assignors to General Motors Corporation, Detroit, Mich., a corporation of Delaware
Filed Feb. 4, 1960, Ser. No. 6,759
8 Claims. (Cl. 267—31)

This invention relates to vehicle suspension systems using main springs between the sprung mass and the unsprung mass of the vehicle whereby the sprung mass is resiliently supported on the unsprung mass, the sprung mass comprising generally the chassis and body of the vehicle while the unsprung mass comprises generally the road engaging wheels and the axles for the vehicle. The main springs of the vehicle may be either of the leaf type or coil type or they may be air springs or torsion bars. However the main springs are controlled on their rebound movement as well as on their compressive movement by means of shock absorbers that are connected between the sprung mass and the unsprung mass of the vehicle, usually adjacent each of the main springs of the vehicle whereby each of the main springs is controlled by its respective shock absorber.

Each of the main springs for the vehicle is controlled by its respective shock absorber in a manner that on expansive movement of the spring, that is on rebound movement of the vehicle body away from the axle, the shock absorber damps or restricts the expansive movement of the spring so as to control the rebound movement of the body of the vehicle away from the axle; and on compressive movement of the spring, that is on movement of the body and the axle toward one another, the shock absorber, on its compression stroke, regulates the compressive movement of the spring and thereby the rate of movement of the axle and the body toward one another.

In the present day automobiles, the engineering of the suspension system, that is the main springs and the shock absorbers used in controlling the main springs for any particular size and weight of vehicle is somewhat of a compromise between the ideal suspension for a lightly loaded vehicle carrying a single passenger and a heavily loaded vehicle carrying five or six passengers together with a heavy load of baggage. If the suspension system were engineered solely for a lightly loaded vehicle, then the suspension system would be inadequate for supporting a heavily loaded vehicle. On the other hand if the suspension system is engineered to support the maximum load that might be expected to be carried by the vehicle, then the suspension system becomes quite rigid and results in harsh ride in the vehicle.

Thus it has been necessary to engineer the spring system for a particular vehicle as a compromise between the two extreme conditions of use of a vehicle, and this is particularly true in passenger vehicles and in station wagons that are in use today. This compromise type of engineering requirement results in a vehicle that rides more stiffly when lightly loaded and which is provided with somewhat inadequate suspension support when the vehicle is fully loaded to the extent that when the vehicle is fully loaded, the rubber bump stops that are provided on all vehicles between the frame and axle of the vehicle tend to engage the axle more frequently than should be necessary when the vehicle is fully loaded.

Furthermore, passenger automobiles, and particularly the station wagon type of automobile, are in use more and more to pull trailers, boats, and to carry much other heavy equipment for temporary periods of time. This overloads the suspension system balance and causes the rear end of the vehicle to sag excessively and in many cases causes the frame of the vehicle to ride on the axle by way of the bump stops. In addition, when the rear end of the vehicle is heavily loaded, the front end of the vehicle tends to be thrown up into the air so that the headlight beam of the vehicle is thrown into the air and into the vision of an oncoming vehicle, which tends to make for dangerous driving conditions.

This problem has been recognized in the automobile industry as evidenced by the fact that helper springs have been designed for use on vehicles for placement between the axle and the frame or chassis of the vehicle so as to give added spring effect to the main spring. However, these helper springs have generally been designed to work continuously with the main spring to increase its effect with the result that the vehicle produces an unpleasant ride when it is lightly loaded and in many instances the helper springs have materially raised the rear end of the vehicle when it is lightly loaded which adversely affects the headlight beam adjustment under these conditions.

In this invention an auxiliary air spring is carried by the shock absorber for each of the respective springs, if desired, but mainly used on the shock absorbers for the two rear springs of the vehicle. The air spring on the shock absorber is constructed and arranged in a manner that it will not produce any substantial change in the normally engineered spring suspension for a vehicle, but which air spring can be supplied with air under pressure, or any suitable gas under pressure, whenever a load above a normal load is to be carried by the vehicle so that the main spring of the vehicle will be aided during the period of abnormal load carrying by the vehicle to increase the load carrying capacity of the total suspension system and thereby prevent bottoming of the vehicle even though it is heavily loaded.

It is therefore an object of this invention to provide a suspension system which incorporates an auxiliary spring with a hydraulic shock absorber for connection between the sprung mass and the unsprung mass of the vehicle to add to the suspension effect of the main spring when air under pressure is supplied to the air spring and which will not in any substantial respect have any effect on the operation of the main spring when the air pressure is released from the air spring. In this manner the main spring of the suspension system can be engineered in the conventional manner without requiring special consideration with regard to the auxiliary spring that is incorporated with the shock absorber.

It is another object of this invention to provide an auxiliary unit composed of a shock absorber and an air spring carried thereon which is adapted to be mounted on a vehicle in the same place as the conventional shock absorbers so that the suspension system balance of the vehicle will not be altered to any substantial extent by incorporation of the auxiliary unit of this invention between the sprung mass and the unsprung mass of the vehicle in the same place as the conventional shock absorbers, the auxiliary unit of this invention allowing the conventional springs to function in their normal manner under any and all load conditions applied to the vehicle in the same manner as though the auxiliary air spring unit was not incorporated on the shock absorber, but which air spring unit can be supplied with air or other gas under pressure manually by the operator of the vehicle to offset any above normal load increase applied to the vehicle by way of extra number of passengers or baggage or boat trailer, etc., the air spring unit thereby maintaining a vehicle in a normal level condition, with the above normal load offset properly. Since the auxiliary air spring unit of this invention merely offsets the additional load applied to the vehicle, the ride characteristics of the vehicle will not be materially changed, and will be improved to the extent that the vehicle is prevented from the usual bottoming that results from an overloaded condition.

It is another object of the invention to provide an auxiliary unit composed of a shock absorber carrying an air spring in the manner heretofore described wherein the shock absorber and the air spring are constructed and arranged in a manner that the air pressure or gas pressure within the air spring causes the gas chamber in the reservoir of the shock absorber to become supercharged, or charged with gas pressure substantially above atmosphere, to insure more consistent operation of the shock absorber and reduce frothing of the oil in the shock absorber as a result of the increased air pressure in the air chamber applied to the oil in the body of the oil in the reservoir of the shock absorber.

While the foregoing objects of the invention can be accomplished by the application of the auxiliary unit of shock absorber and air spring to replace the conventional shock absorbers on vehicles that are already on the road, and on those vehicles wherein the auxiliary unit of this invention is not applied as original equipment at the time of manufacture, it is entirely within the purview of this invention that the auxiliary unit of this invention will permit engineering of a main suspension spring for a vehicle to be more resilient and of just sufficient strength to support the minimum load, such as a one passenger load in a vehicle and then to use the air spring of the auxiliary unit to aid the main spring of the vehicle in supporting any load more than one passenger load. Under this circumstance the main spring could be engineered to give the most comfortable ride under the light load condition of the vehicle and then utilize the air spring to support any heavier load by manually increasing the air pressure in accordance with the load in the vehicle so that the ride characteristics of the vehicle will remain substantially the same as under the light load conditions.

These and other objects of the invention will be apparent from the drawings on the following detail description.

In the drawings:

FIGURE 1 is a longitudinal cross-sectional view of the auxiliary unit of this invention comprising a shock absorber and an air spring;

FIGURE 2 is a longitudinal view of a part of a vehicle illustrating the use of the auxiliary unit of this invention on the vehicle;

FIGURE 3 is a transverse view of a vehicle illustrating the use of the auxiliary unit of this invention between the sprung mass and the unsprung mass of the vehicle.

In FIGS. 1 and 2 of the drawings, the rear portion of an automotive vehicle 10 is illustrated, the vehicle being of the passenger type, although it will be understood that the invention is equally applicable to station wagons, trucks and other types of motor vehicles that have a sprung assembly supported upon an unsprung assembly. The automobile 10 includes a sprung assembly 11 and an unsprung assembly 12. The sprung assembly conventionally includes the body 13 supported on a chassis frame 15 and the other parts thereof that are conventionally associated with the body and the chassis frame as the sprung assembly. The unsprung assembly includes the ground engaging wheels 16 supported conventionally on the axle housing 17 and the other parts therewith normally associated with this unsprung assembly.

The sprung assembly is supported upon the unsprung assembly by means of leaf springs 20, the leaf spring 20 being secured on the axle housing 17 by a spring seat and the U-bolts 21. Opposite ends of the leaf spring assembly are secured to the chassis frame 15 by means of the shackle connections 22, whereby the chassis frame 15 is supported upon the axle housing 17. It will be appreciated that while the drawings illustrate a leaf-type spring as the main spring for suspending the sprung assembly on the unsprung assembly, other suitable and conventional types of springs can be used, such as coil springs, air springs, torsion bars, etc. without departing from the scope of this invention. Also, the auxiliary units 25, each consisting of a shock absorber and an air spring hereinafter more fully described, are illustrated as being used at the rear end of a vehicle. These units can also be used at the front of the vehicle without departing from the scope of the invention.

The auxiliary units 25 each has an attachment member 26 at one end thereof by which the unit 25 is attached to the chassis frame 15. Also, each of the auxiliary units 25 has an attachment member 27 by which the auxiliary units are attached to the unsprung assembly 12, and specifically by bracket members 28 that extend from the spring seats for the leaf springs 20. As shown in FIG. 3, the auxiliary units 25 are angled inwardly toward the longitudinal center line of the vehicle to provide for stability of the vehicle when traversing curves and corners.

Each of the auxiliary units 25 consists of a direct acting shock absorber 30 and an air spring 35 carried on the shock absorber in a manner hereinafter described.

The shock absorber 30 consists of a cylinder tube 31 closed at one end by a rod guide member 32 and at the opposite end by a base valve member 33. The rod guide 32 receives a rod 34 that extends exteriorly of the shock absorber and carries the mounting ring 36 that in turn supports a support member 37 by means of a rubber sleeve 38, the support member 37 providing the attachment fitting 26 for attaching the one end of the shock absorber to the chassis frame 15. The rod 34 carries a shock absorber piston 40 within the cylinder sleeve 31 for reciprocation therein. The cylinder sleeve 31 is positioned coaxially within a reservoir tube 41 that has a cap member 42 welded to one end thereof, this cap member 42 seating upon the upper end 43 of the rod guide member 32, as shown in FIG. 1. The opposite end of the reservoir tube 41 is closed by a cap member 44 having a plurality of inwardly extending ribs 45 on which the base valve member 33 seats whereby the cylinder tube 31 is retained between the cap members 42 and 44, the member 44 being welded to the tube 41 in conventional manner. The cap member 44 carries a mounting ring 46 that in turn supports a support member 47 carried by a rubber sleeve 48, the member 47 providing the means by which the lower end of the shock absorber and air spring assembly is attached to the bracket 28 of the unsprung assembly 12 of the vehicle.

The rod guide member 32 has an annular recess forming a seal chamber 50 in which a rubber-like resilient seal member 51 is confined between the cap member 42 and a retaining washer 52 by means of a compression spring 53. The seal chamber 50 communicates with the reservoir chamber 55 between the reservoir tube 41 and the cylinder tube 31 by means of the port 56 and the passage 57.

The base valve 33 consists of a seat member 60 having an axial bore 61 that receives a valve member 62 having the annular flange 63 supported on the valve seat 64, a finger spring 65 lightly retaining the valve 62 on the seat 64. The valve member 62 has an internal axially positioned valve 70 provided with an axial opening 71 and a radially extending opening 72, the valve 70 having an annular flange portion 73 engaging the valve seat 74 as held thereon by the compression spring 75. The valve member 70 resists flow of hydraulic fluid into the reservoir chamber 55 from beneath the piston 40 on downward movement of the piston toward the base valve 33 as controlled by the spring 75, while the valve member 62 provides for substantial free flow of hydraulic fluid from the reservoir chamber 55 into the area beneath the piston 40 on upward movement of the piston 40 away from the base valve 33.

The shock absorber piston 40 has one series of circumferentially positioned passages 80 closed by the valve member 81 to prevent flow of hydraulic fluid from the chamber above the piston 40 into the chamber below the piston on movement of the piston away from the base valve 33, and to allow fluid flow on opposite direction of movement of the piston between these chambers under control of the action of the valve 81.

Similarly, the piston 40 is also provided with a second circumferentially arranged series of passages 85 closed by a valve member 86 under control of a compression spring 87 by which fluid under pressure is allowed to flow from the chamber above the piston 40 into the chamber below the piston 40 when the pressure in the upper chamber equals the resistance of the spring 87.

The action of the shock absorber of the auxiliary units 25 is the same as any direct acting shock absorber placed between the sprung mass and the unsprung mass of a vehicle. On compression stroke of the shock absorber, that is on movement of the sprung mass 15 toward the unsprung mass 12 of the vehicle, the shock absorber resists this movement by compression of the hydraulic fluid in the cylinder chamber between the piston 40 and the base valve 33, a part of the fluid passing through the valve 81 into the cylinder chamber above the piston and the remaining fluid passing through the valve 70 under the control of the compression spring 75 for flow into the reservoir chamber 55. On rebound stroke of the shock absorber, that is on movement of the sprung mass 15 away from the unsprung mass 12, hydraulic fluid in the cylinder chamber above the piston 40 is forced to flow into the cylinder chamber below the piston under control of the action of the valve 86 and the compression spring 87, additional fluid required to fill the chamber beneath the piston 40 being received from the reservoir chamber 55 through opening of the valve 62.

While one particular internal construction of the shock absorber has been illustrated and described herein, it will be apparent to those skilled in the art that various types of tubular direct acting shock absorbers can be incorporated in this invention without departing from the scope of the invention.

The shock absorber of this invention incorporates the air spring 35 that is under manual control of the operator of the vehicle to render the air spring either active or inactive and thereby render it effective or ineffective in adding its spring support to that of the main spring of the vehicle.

The air spring 35 consists of a composite rubber and fabric laminated tubular structure 90. At one end of the tubular structure 90, there is provided a rigid ring 91 in the enlarged end 92 of the tubular structure 90 that engages an annular recess 93 on the annular support member 94. This annular support member 94 is a part of a cap member 95 that is welded or otherwise attached to the end 96 of the shock absorber rod 34, whereby the member 95 and the end of the tubular member 90 reciprocate with the shock absorber rod 34.

The opposite end 98 of the tubular structure 90 is turned inwardly, as shown in FIG 1, and seats in an annular recess 99 provided in the reservoir tube 41, a rigid ring 100 providing for seating of the enlarged end 101 in the recess 99.

With the ends of the tubular structure being seated respectively on the reservoir tube 41 and the member 94, a closed gas chamber 105 is provided between the reservoir tube 41 and the tubular member 90. It will be apparent that the end 98 of the tubular structure 90 or air bag will reciprocate with the reservoir tube 41 so that the reservoir tube 41 provides a piston element on which the wall portion 107 of the tubular structure rides.

The member 94 is provided with a port 110 and a fitting 111 for admission of gas under pressure into the chamber 105. The fittings 111 are connected by the conduit 112 with a source of air or other gas under pressure 113 through means of a conduit 114 and a manually controlled valve 115 that is under control of the operator of the vehicle. The gas pressure source 113 may be an air pressure bottle or a compressor driven by the engine of the vehicle, as desired.

The member 94 is spaced from the reservoir tube 41 at the end 120 thereof, a space 121 being provided through which gas under pressure is supplied into the air chamber 105 from the port 110 that leads from the space 121. Also, the shock absorber rod seal 51 is enclosed within the cavity formed by the chambered space 121 in the member 94 so that the rod seal is constantly under the effect of the air pressure or gas pressure in the chamber 105 in the air spring. The rod seal 51 is engineered and designed to be primarily effective against loss of hydraulic fluid from the reservoir chamber 55 and from the high-pressure hydraulic fluid produced in a cylinder chamber 31 between the piston 40 and the rod guide 32 of the shock absorber. The rod seal 51 is somewhat less effective against sealing of high-pressure gaseous fluids from the exterior side of the shock absorber so that with the rod seal end of the shock absorber being enclosed within the chamber space 121 and thereby submitted to the effect of the gas under pressure in the chamber 105 of the air spring, the gaseous pressure in the air chamber 105 will seep into the upper end of the reservoir chamber 55 of the shock absorber through the rod seal 51 and increase the pressure in the reservoir chamber 55 to substantially above atmosphere. This increase in pressure in the reservoir chamber 55 tends to supercharge the hydraulic fluid in the reservoir chamber and obtain thereby more consistent operation of the shock absorber and to reduce frothing of the oil in the reservoir chamber as a result of the higher gaseous pressure existent in the reservoir chamber 55. The tendency of the gas under pressure is to seep into the chamber 55 rather than exhaust from it because of the more effective sealing of the seal member 51 against loss of hydraulic fluid in a direction of outflow from the hydraulic fluid rather than in a direction of inflow from the outside of the shock absorber. Thus the gaseous pressure tends to remain within the reservoir chamber 55 of the shock absorber.

A baffle ring 130 is provided in the reservoir chamber tending to reduce frothing of the oil in the reservoir chamber.

In normal practice shock absorbers that are to be used with a particular automotive vehicle are calibrated with respect to the main suspension springs in a manner to provide, in cooperation with the main suspension springs, a desired ride effect on the vehicle. The shock absorber valving in calibrated so that the shock absorbers will effectively dampen the rebound of the main springs and so that they will have sufficient compression resistance to eliminate wheel hop while at the same time, the resistance is not excessive so as to impair a soft comfortable ride in the vehicle. At the same time, the main springs for the vehicle are engineered as a compromise between the suspension necessary to support a minimum load and that required to support a maximum load of the vehicle in a manner that a minimum load will be supported without undue ride harshness and at the same time the maximum load expected to be carried by the vehicle under normal conditions will be sufficiently supported then under normal circumstances the body of the vehicle will not ride on the bump stops provided between the chassis and the axle of the vehicle. These normal engineering practices need not be changed to adapt the auxiliary unit 25 to a vehicle that has had the spring suspension system and shock absorber engineered in the normal manner. This is because under normal circumstances the shock absorber 30 of the auxiliary unit 25 can be engineered in the same manner as the normal shock absorber conventionally used on a vehicle, the air chamber 105 of the air spring 35 being normally maintained at a pressure just slightly above atmosphere when the shock absorber is fully extended so that the walls of the air spring unit will not rub one upon the other, that is the air spring unit will not collapse. An internal pressure of the value of 10 to 15 pounds per square inch is sufficient for this purpose when the shock absorber and the air spring unit are at normal static trim height for the vehicle. This low value air pressure within the air chamber 105 will not substantially change the normal spring suspension effect of the main springs of the vehicle as engineered by the automotive manufacturer, and therefore will not substantially change the ride effect normally built into a vehicle by the manufacturer. The shock absorber 30 will have substantially the same characteristics as the normal shock absorber originally placed on the vehicle as manufactured so that the damping effect of the shock absorber will be substantially the same as though the air spring 35 was not carried on the shock absorber.

With a normal one to five passenger car load in the vehicle on which the auxiliary units of this invention are applied, the minimum air pressure heretofore mentioned is sufficient within the chamber 105 of the air spring 35, the vehicle normally being engineered to carry such a passenger load, without adverse effect of excessive engagement of the bump stops on the vehicle.

However, when large baggage loads are carried in the trunk of a passenger vehicle or on the deck of a station wagon, or when a boat trailer is attached to the rear of a passenger vehicle or station wagon, an above normal dead weight load is carried at the rear end of the vehicle. This abnormal load causes excessive engagement of the bump stops on the vehicle, and causes elevation of the headlight beam at night which results in dangerous driving conditions.

When above normal loads are carried by a vehicle, the operator of the vehicle can open the valve 115 to allow air or other gas under pressure to be supplied from the source 113 into the air chambers 105 of the air springs 35 so that the air pressure within the air chambers 105 provides additional support or resistance for and with the main springs 20 of the vehicle to support the above normal load in or on the vehicle. For example, a pressure of 60 p.s.i. in the air chambers 105 will compensate for about an additional 200 pounds per wheel with the auxiliary units 25 at static trim height. The operator of the vehicle can readily determine the normal level condition of the vehicle by the angle of his headlight beams.

As shown in FIG. 3, the valve 115 is shown in a closed position to prevent either fluid pressure flow to the air springs 35 or exhaust of air pressure from the air springs. When the operator desires to supply air to the air springs, the rotary element 115a of the valve 115 is rotated so that its passage 115b connects the conduit portion 114a with the conduit portion 114b. When the air pressure rises in the air springs to the desired value, the operator can then return the valve to the closed position shown in FIG. 3.

When the excessive load or abnormal load is removed from the vehicle, the air pressure previously added to the air springs 35 should be dropped to the minimum low value previously mentioned herein to render the air springs substantially ineffective and return the vehicle to full suspension on the main springs only. This is accomplished by rotation of the member 115a of the valve 115 to connect the conduit portion 114b with an exhaust conduit 114c to allow the air pressure to exhaust from the air springs, the operator then returning the valve to the off position shown in FIG. 3 to maintain a minimum aforementioned pressure in the air springs to prevent their collapse on full extension of the shock absorber on a rebound stroke.

While the embodiment of the present invention as herein disclosed, constitutes a preferred form, it is to be understood that other forms might be adopted.

What is claimed is as follows:

1. A shock absorber and air spring unit assembly, comprising, a hydraulic direct-acting tubular shock absorber having relatively movable telescopic parts including a tubular outer casing member and a rod extending therefrom at one end thereof, a resiliently flexible tubular wall unit forming an annular air spring member having an inner wall portion and an outer wall portion closed at one end by a rolling wall portion formed of said inner and outer wall portions on relative reciprocation therebetween, said inner wall portion engaging said casing in full support thereof on said casing on said relative reciprocation between said inner and outer wall portions, said inner wall portion having the free end thereof positioned between opposite ends of said casing, means at the said free end of said inner wall portion securing the same to said casing, means at the free end of said outer wall portion providing attachment and support thereof on said rod, wall means including said shock absorber casing and said air spring member providing a closed fluid pressure receiving chamber for receiving fluid under pressure to resist thereby telescopic movement of the said shock absorber parts, and fluid connection port means in said wall means for supply and exhaust of fluid to and from said chamber.

2. A suspension device constructed and arranged in accordance with claim 1 in which the said fluid receiving chamber encloses the end of the shock absorber at which the said shock absorber parts telescope with respect to one another.

3. In a suspension device, a hydraulic direct acting tubular shock absorber having relatively movable telescopic parts including a tubular outer casing member and a reciprocable rod extending therefrom at one end thereof, a resiliently flexible tubular air spring member disposed concentrically around at least a part of the length of the shock absorber, said air spring member having a tubular inner wall portion and a concentrically arranged tubular outer wall portion spaced from the inner wall portion and integral therewith through a U-bend section formed from the inner or the outer wall portions respectively on reciprocal movement therebetween, said inner wall portion engaging and being fully supported on said casing with the free end thereof positioned between opposite ends of said casing, means at the free end of said inner wall portion of said air spring member securing the same on said casing, means at the free end of said outer wall portion of said air spring member providing engagement with and rigid support thereof on said rod, wall means including said shock absorber and the said wall portions of said air spring member forming a closed fluid pressure receiving chamber surrounding a major part of the length of said shock absorber for receiving fluid under pressure with the said U-bend section having one end constantly engaging and supported by said shock absorber tubular outer casing member, said air spring member resisting telescopic movement of the said shock absorber parts on admission of fluid under pressure into the said chamber, and fluid connection port means in the said wall means for supply of fluid to and exhaust of fluid from said chamber.

4. In a suspension device, a hydraulic direct acting tubular shock absorber including a tubular reservoir tube concentrically surrounding a cylinder tube spaced therefrom to provide a reservoir chamber therebetween with the cylinder tube containing a piston reciprocably slidable therein and attached on one end of a piston rod that extends exteriorly from one end of the shock absorber through said cylinder and reservoir tubes, said rod being received telescopically within said cylinder tube on reciprocation thereof, a resiliently flexible tubular air spring member disposed concentrically around a major part of said reservoir tube, said air spring member having a tubular inner wall portion and a concentrically arranged tubular outer wall portion spaced from the inner wall portion and integral therewith through a U-bend section formed from the inner or the outer wall portions respectively on reciprocal movement therebetween, said inner wall portion continuously engaging and fully supported on said reservoir tube with the free end thereof positioned between opposite ends of said reservoir tube, means at the free end of said inner wall portion securing the same on said reservoir tube, means at the free end of said inner wall portion securing the same on said reservoir tube, means at the free end of said outer wall portion providing attachment and support thereof on said rod, said reservoir tube and the said wall portions of said tubular air spring member forming partially rigid wall and partially flexible wall means providing therebetween a closed fluid pressure receiving chamber for receiving fluid under pressure therein, admission of fluid under pressure into said chamber causing said air spring member to resist telescopic movement of the said rod into said cylinder tube, and fluid connection port means in the said wall means for supply of fluid to and exhaust of fluid from said chamber.

5. A suspension device constructed and arranged in accordance with claim 4 in which the end of the shock absorber at which the said rod enters the said cylinder tube has a seal therein preventing escape of fluid under pressure from said cylinder tube and is confined within the said fluid receiving chamber, said rod and said cylinder tube cooperating to define an orifice whereby a greater fluid pressure in said fluid receiving chamber of said air spring than the fluid pressure in said reservoir chamber of said shock absorber results in movement of fluid pressure past said seal into the said reservoir chamber from the said fluid receiving chamber of said air spring.

6. In an automotive vehicle suspension system, the combination including a sprung assembly and an unsprung assembly, a main suspension spring positioned between said sprung assembly and said unsprung assembly and connected therewith to yieldably support said sprung assembly on said unsprung assembly, a hydraulic direct acting tubular shock absorber adjacent the said main suspension spring and extending between the sprung assembly and the unsprung assembly to dampen relative movement between the sprung assembly and the unsprung assembly, said shock absorber including relatively movable telescopic parts comprising an outer reservoir tube and a rod extending therefrom, one of said parts of said shock absorber including means connecting the same to said sprung assembly and the other of said parts including means connecting the same to the unsprung assembly adjacent the said main spring, a resiliently flexible tubular air spring member disposed concentrically around a major part of the length of said shock absorber, said air spring member having a tubular inner wall portion and a concentrically arranged tubular outer wall portion spaced from the inner wall portion and integral therewith through a U-bend section formed from the inner or the outer wall portions respectively on reciprocal movement therebetween, said inner wall portion engaging and being fully supported on said reservoir tube, means at the free end of the said inner wall portion securing the same on said reservoir tube between opposite ends thereof, means at the free end of said outer wall portion securing the same on said rod whereby to obtain reciprocal movement between said inner wall portion and said outer wall portion of said air spring member by reciprocal telescopic movement of said shock absorber parts, said shock absorber and wall portions of said air spring member forming partially rigid and partially flexible wall means providing a closed fluid pressure receiving chamber around said shock absorber for receiving fluid under pressure, admission of fluid under pressure into said fluid receiving chamber resisting thereby telescopic movement of said shock absorber parts and adding to the resistance of said main spring in support of the sprung assembly on the unsprung assembly, fluid connection port means in the said wall means of said air spring member providing for supply of fluid to said fluid receiving chamber and exhaust of fluid therefrom, and valve means manually operated by the operator of the vehicle in fluid connection with said port means and with a fluid pressure source providing for operator controlled supply of fluid under pressure to said fluid receiving chamber of said air spring and exhaust of fluid pressure therefrom.

7. In an automotive vehicle suspension system constructed and arranged in accordance with claim 6, the sprung assembly and the unsprung assembly being supported by main suspension springs at each of opposite sides of the assembly, each of the main suspension springs being aided by a shock absorber and air spring combination as set forth in claim 6.

8. In a suspension device, a hydraulic direct acting tubular shock absorber including a tubular pressure cylinder, a piston slidably disposed in said pressure cylinder, valve means associated with said piston to control flow of hydraulic fluid from one side of the piston to the other side thereof, a reservoir tube concentrically surrounding siad cylinder in spaced relation thereof forming thereby a fluid reservoir space, valve means closing one end of said pressure cylinder and providing fluid flow connection between said cylinder and said reservoir space, means closing the end of said reservoir tube adjacent said pressure cylinder valve means, a piston rod connected with said piston and projecting beyond the opposite ends of said tubes, closure means closing said opposite ends of said tubes and slidably receiving said piston rod including seal means for said piston rod, attachment means on said one end of said reservoir tube and on the projecting end of said piston rod for attachment thereof with relatively movable assemblies, a resiliently flexible tubular wall unit forming an annular air spring member having an inner wall portion and an outer wall portion closed at one end by a rolling wall portion formed of said inner and outer wall portions on relative reciprocation therebetween, said inner wall portion engaging said reservoir tube in full support thereof on said reservoir tube on said relative reciprocation between said inner and outer wall portions, said inner wall portion having the free end thereof positioned between opposite ends of said reservoir tube, means at the said free end of said inner wall portion securing the same to said reservoir tube, means at the free end of said outer wall portion providing attachment and support thereof on said rod, said reservoir tube and said air spring member by its attachment to said reservoir tube and said rod forming wall means providing therebetween a closed fluid pressure receiving chamber for receiving fluid under pressure to resist thereby telescopic movement of the said rod into said cylinder, and fluid connection port means in the said wall means for supply and exhaust of fluid to and from said chamber.

References Cited in the file of this patent

UNITED STATES PATENTS

| | | |
|---|---|---|
| 2,361,575 | Thompson | Oct. 31, 1944 |
| 2,874,955 | McIntyre et al. | Feb. 24, 1959 |
| 2,922,635 | DeLorean | Jan. 26, 1960 |
| 2,980,441 | Timpner et al. | Apr. 18, 1961 |

FOREIGN PATENTS

| | | |
|---|---|---|
| 214,922 | Australia | May 2, 1958 |

OTHER REFERENCES

German application 1,064,825, printed Sept. 3, 1959 (KL. 63C 41).